F. L. HAWKINS.
STOCK FEEDER.
APPLICATION FILED FEB. 28, 1919.
1,316,838.
Patented Sept. 23, 1919.
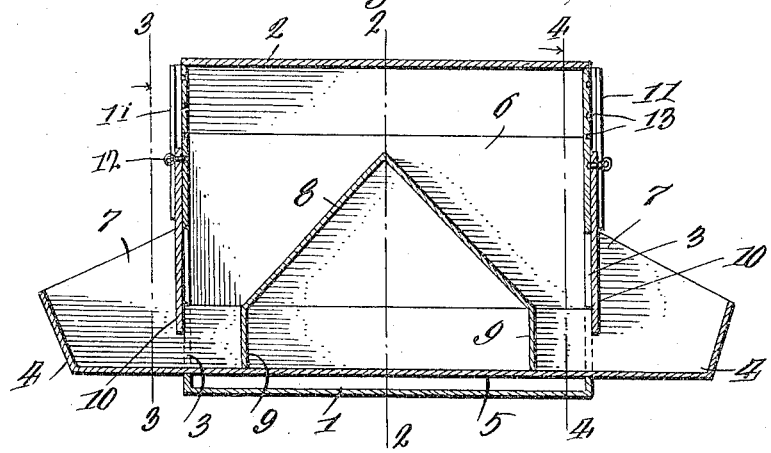
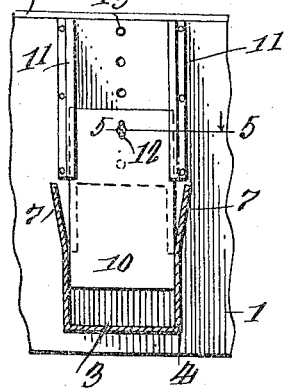
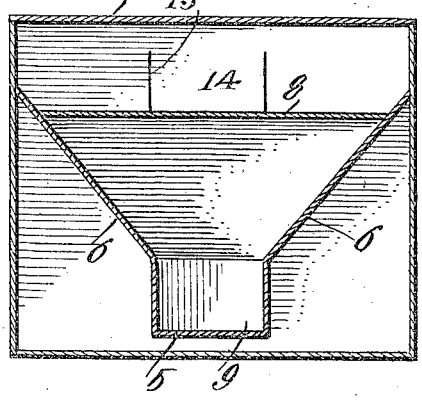
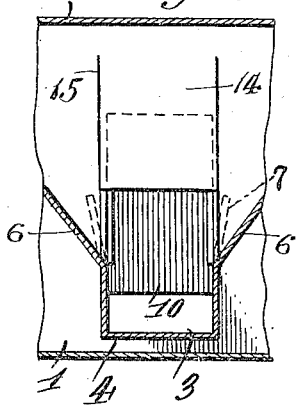
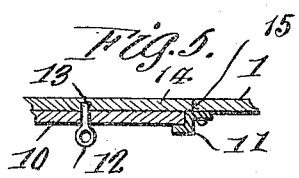
WITNESS:
Guy M. Spring
U. B. Hillyard
INVENTOR.
Frank L. Hawkins
BY
Richard B. Owen
ATTORNEY.

UNITED STATES PATENT OFFICE.

FRANK L. HAWKINS, OF TARKIO, MISSOURI.

STOCK-FEEDER.

1,316,838.  Specification of Letters Patent.  Patented Sept. 23, 1919.

Application filed February 28, 1919. Serial No. 279,744.

*To all whom it may concern:*

Be it known that I, FRANK L. HAWKINS, a citizen of the United States, residing at Tarkio, in the county of Atchison and State of Missouri, have invented certain new and useful Improvements in Stock-Feeders, of which the following is a specification.

The invention relates to means for containing feed in bulk and automatically supplying the same to a trough or like part as the same is consumed, thereby maintaining a given level or supply of feed in the trough to prevent waste and yet insure proper feeding of the stock.

The invention consists of a device of peculiar structural formation embodying a container for holding the feed in quantity, a trough for receiving a predetermined amount of feed from the container and means whereby the feed is positively delivered from the container to the trough in measured quantity so that there is always an ample amount of feed in the trough for the stock so long as the container holds a supply.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing hereto attached,

Figure 1 is a vertical, central, longitudinal section of a stock feeder embodying the invention.

Fig. 2 is a transverse section on the line 2—2 of Fig. 1.

Fig. 3 is a sectional detail on the line 3—3 of Fig. 1.

Fig. 4 is a sectional detail on the line 4—4 of Fig. 1.

Fig. 5 is a sectional detail of the gate and supplying means therefor on the line 5—5 of Fig. 3.

Corresponding and like parts are referred to in the following description and indicated in the several views of the drawing by like reference characters.

The feeder comprises a container 1 which is of box like formation. A closure 2 covers the top of the container and is movable to admit of access to the interior of the feeder to supply feed thereto or for any purpose whatsoever. An opening 3 is formed in the lower portion of each end wall of the container for the discharge of the feed therefrom into troughs 4. The troughs 4 consist preferably of extensions of a trough 5 which is located within the container and which is provided with oppositely disposed side wings 6 which flare upwardly and make close contact at their upper edges with the side walls of the container. It will thus be understood that the feed supplied in quantity to the container is directed by the flaring wings 6 into the trough 5 and does not tend to collect within the container. The wings 6 extend the entire length of the container and their extremities touch the inner faces of the end walls thereof. The troughs 4 are of greater depth than the main trough 5 and their side walls slope in an upward direction from the extremities of the troughs. The upper sloping portions of the side walls of the troughs 4 are outwardly deflected, as indicated at 7 so as to engage the outer faces of the end walls of the container beyond the openings 3, as indicated most clearly in Figs. 3 and 4. In this manner longitudinal movement of the trough is prevented. In assembling the parts the trough 5 may be passed through the opening 3 in one of the end walls of the container, the advancing end passing through the opening 3 in the opposite end wall of the container. After the trough 5 has been properly positioned so that its end portions 4 project a like distance beyond the ends of the container the upper portions 7 of the side walls of the trough 4 are bent outwardly to engage the end walls of the container, thereby holding the trough in position without requiring any fastening means. The wings 6 may be bent so as to clear the opening when placing the trough in position, said wings being subsequently bent to the position indicated in Fig. 2. Another way to provide for the passage of the wings 6 is to form the end walls of the container with vertical cuts 15 in line with the sides of the openings 3 and of a length corresponding to the height or depth of the wings 6. The portions 14 formed between the cuts 13 are adapted to be bent upwardly to admit of passing the trough through the end walls of the container. After the trough has been properly positioned the wings 6 are bent laterally into the flared position indicated in Figs. 2 and 4 and the portions 7 are bent laterally so as to engage the outer sides of the end walls adjacent the openings formed therein. It will thus be understood that the end walls of the container are held between the wings 6 upon the inside and the parts 7 upon the outside. The guides 11 overlap the cuts 13, as indicated most clearly in Fig. 5. After the trough is in position the parts 14 are bent back into normal position so as to lie in the plane of the respective end walls. Before placing the trough in position the wings 6 and the extensions 7 of the sides are bent so as to clear the space in the end wall formed by the opening 3 and the space resulting from the upward bending of the part 14.

A divider and deflector is located in the trough 5 and between the flaring side wings 6 thereof and comprises oppositely inclined portions 8 and depending portions 9, the latter extending into the trough 5 and the oppositely inclined portion 8 occupying a position between the flaring wings 6. The depending portions 9 are spaced a short distance from the end walls of the container and the inclined elements of the part 8 direct the feed toward the opening 3. It will thus be understood that the container 1 is divided in a manner to provide hoppers. The front walls of the hoppers are formed by the end walls of the container and are vertical. The side walls of the hoppers are upwardly flared and constitute portions of the wings 6. The rear walls of the hoppers are inclined forwardly and downwardly from their upper edges and constitute parts of the divider and deflector 8.

A gate 10 is provided for each of the openings 3 and is mounted in guide ways 11 secured to the end walls of the container. The gates 10 are secured in the required adjusted position by means of a pin 12 passing therethrough and adapted to engage one of a series of openings 13 formed in the end wall of the container. The distance between the lower edge of the gate 10 and the bottom of the trough determines the level of the feed in the trough as will be readily understood.

While the feeder may be constructed of any material it is preferred to form the same of sheet metal such as galvanized iron which admits of the ready assemblage of the parts and the bending of the different portions such as the parts 7, the wings 6 and the parts 8 and 9. The divider and deflector may be readily placed in position or removed thereby providing for easily and quickly cleaning the feeder at stated intervals. When the cover 2 is open the feed may be supplied to the container and automatically passes into the trough 4, the latter being maintained at a given level so long as there is any feed in the container to be automatically supplied therefrom to the trough.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A stock feeder, comprising a container having an opening in an end wall thereof and a trough disposed within the container and having wings engaging the inner side of the end wall, and having an end portion projecting through the opening and forming a feeding trough exterior to the container, said feeding trough having upper portions of its side walls outwardly deflected to engage the outer side of the end wall of the container beyond the opening formed therein.

2. A stock feeder, comprising a container having an opening in an end wall thereof and a trough disposed within the container and having an end portion projection through the opening and forming a feeding trough exterior to the container, said trough having flaring wings within the container to direct the feed into the trough, and a member comprising an inclined portion extending between the flaring wings and a depending portion entering the trough, the space thus inclosed constituting a hopper, the rear and side walls of which are upwardly flared.

3. A stock feeder, comprising a container having discharge openings in opposite ends, a trough disposed within the container and having end portions projecting through the opening in the end walls thereof and constituting feeding troughs, the upper portions of the feeding troughs being outwardly deflected to engage the end walls of the container beyond the openings therein to retain the trough in proper position.

4. A stock feeder, comprising a container having discharge openings in opposite ends, a trough disposed within the container and having end portions projecting through the opening in the end walls thereof and constituting feeding troughs, said trough having said wings upwardly flared and engaging the sides of the container along their upper edges and the ends of the container at their extremities.

5. A stock feeder, comprising a container having discharge openings in opposite ends, a trough disposed within the container and having end portions projecting through the opening in the end walls thereof and constituting feeding troughs, said trough having said wings upwardly flared and engaging the sides of the container along their upper edges and the ends of the container at their extremities, and a combined divider and deflector comprising an oppositely inclined portion disposed between the flaring wings and depending portions extending into the trough.

6. A stock feeder, comprising a container having discharge openings in opposite ends, a trough disposed within the container and having end portions projecting through the opening in the end walls thereof and constituting feeding troughs, said trough having said wings upwardly flared and engaging the sides of the container along their upper edges and the ends of the container at their extremities, and a combined divider and deflector comprising an oppositely inclined portion disposed between the flaring wings and depending portions extending into the trough, and gates for closing the openings in the end walls of the container and adapted to regulate the supply of feed to the feeding troughs.

In testimony whereof I affix my signature in presence of two witnesses.

FRANK L. HAWKINS.

Witnesses:
A. B. GORDON,
J. C. W. HAWKINS.